(12) United States Patent
Nahill et al.

(10) Patent No.: US 8,962,114 B2
(45) Date of Patent: Feb. 24, 2015

(54) COMPRESSION MOLDED PREFORM FOR FORMING INVERTIBLE BASE HOT-FILL CONTAINER, AND SYSTEMS AND METHODS THEREOF

(75) Inventors: Thomas E. Nahill, Amherst, NH (US); Ralph Armstrong, Weston, CT (US)

(73) Assignee: Graham Packaging Company, L.P., York, PA (US)

( * ) Notice: Subject to any disclaimer, the term of this patent is extended or adjusted under 35 U.S.C. 154(b) by 349 days.

(21) Appl. No.: 12/916,528

(22) Filed: Oct. 30, 2010

(65) Prior Publication Data
US 2012/0107541 A1    May 3, 2012

(51) Int. Cl.
| | |
|---|---|
| *B32B 1/02* | (2006.01) |
| *B29B 11/14* | (2006.01) |
| *B65D 1/02* | (2006.01) |
| *B29B 11/12* | (2006.01) |
| *B29C 43/36* | (2006.01) |
| *B29L 23/00* | (2006.01) |

(Continued)

(52) U.S. Cl.
CPC .............. *B29B 11/14* (2013.01); *B65D 1/0261* (2013.01); *B29B 11/12* (2013.01); *B29C 43/361* (2013.01); *B29L 2023/00* (2013.01); *B29K 2067/003* (2013.01); *B29C 49/12* (2013.01); *B29B 2911/14326* (2013.01); *B29B 2911/14333* (2013.01); *B29B 2911/14486* (2013.01); *B29B 2911/14493* (2013.01); *B29C 2049/028* (2013.01)
USPC .... 428/35.7; 428/36.6; 428/36.92; 428/542.8

(58) Field of Classification Search
CPC ...... B65D 1/02; B65D 1/0207; B65D 1/0223; B65D 1/0261; B65D 35/08
USPC ........... 428/34.1, 34.4, 34.6, 34.7, 35.7, 36.4, 428/36.6, 36.7, 36.9, 36.91, 36.92, 542.8
See application file for complete search history.

(56) References Cited

U.S. PATENT DOCUMENTS

| | | | |
|---|---|---|---|
| 1,499,239 | A | 6/1924 | Malmquist |
| D110,624 | S | 7/1938 | Mekeel, Jr. |

(Continued)

FOREIGN PATENT DOCUMENTS

| | | |
|---|---|---|
| AU | 2002257159 B2 | 4/2003 |
| CA | 2077717 A1 | 3/1993 |

(Continued)

OTHER PUBLICATIONS

U.S. Appl. No. 13/210,350, filed Aug. 15, 2011, Wurster et al.

(Continued)

*Primary Examiner* — Walter B Aughenbaugh
(74) *Attorney, Agent, or Firm* — Baker Botts L.L.P.

(57) ABSTRACT

A compression molded preform for forming an invertible base hot-fill container, and systems and methods thereof. The preform includes a body with a first open end, a second closed end or end cap of hemispherical shape, and a sidewall extending between the first end and the second end. At least a portion of the second end is thinner than any portion of the sidewall. Further, the second end is gateless and has an inner surface that is substantially smooth along its entire area. The compression molded preform is blow molded to form a plastic container with an invertible or movable base. The invertible or movable base is responsive to, or can be moved based on, internal forces or pressure associated with processing the container with a filled product.

12 Claims, 5 Drawing Sheets

(51) Int. Cl.
*B29K 67/00* (2006.01)
*B29C 49/12* (2006.01)
*B29C 49/02* (2006.01)

(56) References Cited

U.S. PATENT DOCUMENTS

| | | | |
|---|---|---|---|
| 2,124,959 A | 7/1938 | Vogel | |
| 2,142,257 A | 1/1939 | Saeta | |
| 2,378,324 A | 6/1945 | Ray et al. | |
| 2,880,902 A | 4/1959 | Owsen | |
| 2,960,248 A | 11/1960 | Kuhlman | |
| 2,971,671 A | 2/1961 | Shakman | |
| 2,982,440 A | 5/1961 | Harrison | |
| 3,043,461 A | 7/1962 | Glassco | |
| 3,081,002 A | 3/1963 | Tauschinski et al. | |
| 3,090,478 A | 5/1963 | Stanley | |
| 3,142,371 A | 7/1964 | Rice et al. | |
| 3,174,655 A | 3/1965 | Hurschman | |
| 3,198,861 A | 8/1965 | Marvel | |
| 3,201,111 A | 8/1965 | Afton | |
| 3,301,293 A | 1/1967 | Santelli | |
| 3,325,031 A | 6/1967 | Singier | |
| 3,397,724 A | 8/1968 | Bolen et al. | |
| 3,409,167 A | 11/1968 | Blanchard | |
| 3,417,893 A | 12/1968 | Lieberman | |
| 3,426,939 A | 2/1969 | Young | |
| 3,441,982 A | 5/1969 | Tsukahara et al. | |
| 3,468,443 A | 9/1969 | Marcus | |
| 3,483,908 A | 12/1969 | Donovan | |
| 3,485,355 A | 12/1969 | Stewart | |
| 3,693,828 A | 9/1972 | Kneusel et al. | |
| 3,704,140 A | 11/1972 | Petit et al. | |
| 3,727,783 A | 4/1973 | Carmichael | |
| 3,791,508 A | 2/1974 | Osborne et al. | |
| 3,819,789 A | 6/1974 | Parker | |
| 3,904,069 A | 9/1975 | Toukmanian | |
| 3,918,920 A | 11/1975 | Barber | |
| 3,935,955 A | 2/1976 | Das | |
| 3,941,237 A | 3/1976 | MacGregor, Jr. | |
| 3,942,673 A | 3/1976 | Lyu et al. | |
| 3,949,033 A | 4/1976 | Uhlig | |
| 3,956,441 A | 5/1976 | Uhlig | |
| 4,035,455 A | 7/1977 | Rosenkranz et al. | |
| 4,036,926 A | 7/1977 | Chang | |
| 4,037,752 A | 7/1977 | Dulmaine et al. | |
| 4,117,062 A | 9/1978 | Uhlig | |
| 4,123,217 A | 10/1978 | Fischer et al. | |
| 4,125,632 A | 11/1978 | Vosti et al. | |
| 4,134,510 A | 1/1979 | Chang | |
| 4,158,624 A | 6/1979 | Ford et al. | |
| 4,170,622 A | 10/1979 | Uhlig | |
| 4,174,782 A | 11/1979 | Obsomer | |
| 4,177,239 A | 12/1979 | Gittner et al. | |
| 4,219,137 A | 8/1980 | Hutchens | |
| 4,231,483 A | 11/1980 | Dechenne et al. | |
| 4,247,012 A | 1/1981 | Alberghini | |
| 4,301,933 A | 11/1981 | Yoshino et al. | |
| 4,318,489 A | 3/1982 | Snyder et al. | |
| 4,318,882 A | 3/1982 | Agrawal et al. | |
| 4,338,765 A | 7/1982 | Ohmori et al. | |
| 4,355,728 A | 10/1982 | Ota et al. | |
| 4,377,191 A | 3/1983 | Yamaguchi | |
| 4,378,328 A | 3/1983 | Przytulla et al. | |
| 4,381,061 A | 4/1983 | Cerny et al. | |
| D269,158 S | 5/1983 | Gaunt | |
| 4,386,701 A | 6/1983 | Galer | |
| 4,436,216 A | 3/1984 | Chang | |
| 4,444,308 A | 4/1984 | MacEwen | |
| 4,450,878 A | 5/1984 | Takada et al. | |
| 4,465,199 A | 8/1984 | Aoki | |
| 4,495,974 A | 1/1985 | Pohorski | |
| 4,497,855 A | 2/1985 | Agrawal et al. | |
| 4,525,401 A | 6/1985 | Pocock et al. | |
| 4,542,029 A | 9/1985 | Caner et al. | |
| 4,547,333 A | 10/1985 | Takada | |
| 4,585,158 A | 4/1986 | Wardlaw, III | |
| 4,610,366 A | 9/1986 | Estes et al. | |
| 4,628,669 A | 12/1986 | Herron et al. | |
| 4,642,968 A | 2/1987 | McHenry et al. | |
| 4,645,078 A | 2/1987 | Reyner | |
| 4,667,454 A | 5/1987 | McHenry et al. | |
| 4,684,025 A | 8/1987 | Copland et al. | |
| 4,685,273 A | 8/1987 | Caner et al. | |
| D292,378 S | 10/1987 | Brandt et al. | |
| 4,701,121 A | 10/1987 | Jakobsen et al. | |
| 4,723,661 A | 2/1988 | Hoppmann et al. | |
| 4,724,855 A | 2/1988 | Jackson | |
| 4,725,464 A | 2/1988 | Collette | |
| 4,747,507 A | 5/1988 | Fitzgerald et al. | |
| 4,749,092 A | 6/1988 | Sugiura et al. | |
| 4,769,206 A | 9/1988 | Reymann et al. | |
| 4,773,458 A | 9/1988 | Touzani | |
| 4,785,949 A | 11/1988 | Krishnakumar et al. | |
| 4,785,950 A | 11/1988 | Miller et al. | |
| 4,807,424 A | 2/1989 | Robinson et al. | |
| 4,813,556 A | 3/1989 | Lawrence | |
| 4,831,050 A | 5/1989 | Cassidy et al. | |
| 4,836,398 A | 6/1989 | Leftault, Jr. et al. | |
| 4,840,289 A | 6/1989 | Fait et al. | |
| 4,850,493 A | 7/1989 | Howard, Jr. | |
| 4,850,494 A | 7/1989 | Howard, Jr. | |
| 4,863,046 A * | 9/1989 | Collette et al. | 215/381 |
| 4,865,206 A | 9/1989 | Behm et al. | |
| 4,867,323 A | 9/1989 | Powers | |
| 4,880,129 A | 11/1989 | McHenry et al. | |
| 4,887,730 A | 12/1989 | Touzani | |
| 4,892,205 A | 1/1990 | Powers et al. | |
| 4,896,205 A | 1/1990 | Weber | |
| 4,921,147 A | 5/1990 | Poirier | |
| 4,927,679 A | 5/1990 | Beck | |
| 4,962,863 A | 10/1990 | Wendling et al. | |
| 4,967,538 A | 11/1990 | Leftault, Jr. et al. | |
| 4,978,015 A | 12/1990 | Walker | |
| 4,997,692 A | 3/1991 | Yoshino | |
| 5,004,109 A | 4/1991 | Bartley et al. | |
| 5,005,716 A | 4/1991 | Eberle | |
| 5,014,868 A | 5/1991 | Wittig et al. | |
| 5,020,691 A | 6/1991 | Nye | |
| 5,024,340 A | 6/1991 | Alberghini et al. | |
| 5,033,254 A | 7/1991 | Zenger | |
| 5,054,632 A | 10/1991 | Alberghini et al. | |
| 5,060,453 A | 10/1991 | Alberghini et al. | |
| 5,067,622 A | 11/1991 | Garver et al. | |
| 5,090,180 A | 2/1992 | Sorensen | |
| 5,092,474 A | 3/1992 | Leigner | |
| 5,122,327 A | 6/1992 | Spina et al. | |
| 5,133,468 A | 7/1992 | Brunson et al. | |
| 5,141,121 A | 8/1992 | Brown et al. | |
| 5,178,290 A | 1/1993 | Ota et al. | |
| 5,199,587 A | 4/1993 | Ota et al. | |
| 5,199,588 A | 4/1993 | Hayashi | |
| 5,201,438 A | 4/1993 | Norwood | |
| 5,217,737 A | 6/1993 | Gygax et al. | |
| 5,234,126 A | 8/1993 | Jonas et al. | |
| 5,244,106 A | 9/1993 | Takacs | |
| 5,251,424 A | 10/1993 | Zenger et al. | |
| 5,255,889 A | 10/1993 | Collette et al. | |
| 5,261,544 A | 11/1993 | Weaver, Jr. | |
| 5,279,433 A | 1/1994 | Krishnakumar et al. | |
| 5,281,387 A | 1/1994 | Collette et al. | |
| 5,310,043 A | 5/1994 | Alcorn | |
| 5,333,761 A | 8/1994 | Davis et al. | |
| 5,337,909 A | 8/1994 | Vailliencourt | |
| 5,337,924 A | 8/1994 | Dickie | |
| 5,341,946 A | 8/1994 | Valliencourt et al. | |
| 5,389,332 A | 2/1995 | Amari et al. | |
| 5,392,937 A | 2/1995 | Prevot et al. | |
| 5,405,015 A | 4/1995 | Bhatia et al. | |
| 5,407,086 A | 4/1995 | Ota et al. | |
| 5,411,699 A | 5/1995 | Collette et al. | |
| 5,454,481 A | 10/1995 | Hsu | |
| 5,472,105 A | 12/1995 | Krishnakumar et al. | |
| 5,472,181 A | 12/1995 | Lowell | |
| RE35,140 E | 1/1996 | Powers, Jr. | |

(56) References Cited

U.S. PATENT DOCUMENTS

| | | | |
|---|---|---|---|
| 5,484,052 A | 1/1996 | Pawloski et al. |
| D366,831 S | 2/1996 | Semersky et al. |
| 5,492,245 A | 2/1996 | Kalbanis |
| 5,503,283 A | 4/1996 | Semersky |
| 5,543,107 A | 8/1996 | Malik et al. |
| 5,593,063 A | 1/1997 | Claydon et al. |
| 5,598,941 A | 2/1997 | Semersky et al. |
| 5,632,397 A | 5/1997 | Fandeux et al. |
| 5,642,826 A | 7/1997 | Melrose |
| 5,672,730 A | 9/1997 | Cottman |
| 5,687,874 A | 11/1997 | Omori et al. |
| 5,690,244 A | 11/1997 | Darr |
| 5,697,489 A | 12/1997 | Deonarine et al. |
| 5,704,504 A | 1/1998 | Bueno |
| 5,713,480 A | 2/1998 | Petre et al. |
| 5,718,030 A | 2/1998 | Langmack et al. |
| 5,730,314 A | 3/1998 | Wiemann et al. |
| 5,730,914 A | 3/1998 | Ruppmann, Sr. |
| 5,735,420 A * | 4/1998 | Nakamaki et al. ............ 215/373 |
| 5,737,827 A | 4/1998 | Kuse et al. |
| 5,758,802 A | 6/1998 | Wallays |
| 5,762,221 A | 6/1998 | Tobias et al. |
| 5,780,130 A | 7/1998 | Hansen et al. |
| 5,785,197 A | 7/1998 | Slat |
| 5,819,507 A | 10/1998 | Kaneko et al. |
| 5,829,614 A | 11/1998 | Collette et al. |
| 5,860,556 A | 1/1999 | Robbins, III |
| 5,887,739 A | 3/1999 | Prevot et al. |
| 5,888,598 A * | 3/1999 | Brewster et al. ............ 428/35.7 |
| 5,897,090 A | 4/1999 | Smith et al. |
| 5,906,286 A | 5/1999 | Matsuno et al. |
| 5,908,128 A | 6/1999 | Krishnakumar et al. |
| D413,519 S | 9/1999 | Eberle et al. |
| D415,030 S | 10/1999 | Searle et al. |
| 5,971,184 A | 10/1999 | Krishnakumar et al. |
| 5,976,653 A | 11/1999 | Collette et al. |
| 5,989,661 A | 11/1999 | Krishnakumar et al. |
| 6,016,932 A | 1/2000 | Gaydosh et al. |
| RE36,639 E | 4/2000 | Okhai |
| 6,045,001 A | 4/2000 | Seul |
| 6,051,295 A | 4/2000 | Schloss et al. |
| 6,063,325 A | 5/2000 | Nahill et al. |
| 6,065,624 A | 5/2000 | Steinke |
| 6,068,110 A | 5/2000 | Kumakiri et al. |
| 6,074,596 A | 6/2000 | Jacquet |
| 6,077,554 A | 6/2000 | Wiemann et al. |
| 6,090,334 A | 7/2000 | Matsuno et al. |
| 6,105,815 A | 8/2000 | Mazda |
| 6,113,377 A | 9/2000 | Clark |
| D433,946 S | 11/2000 | Rollend et al. |
| 6,176,382 B1 | 1/2001 | Bazlur Rashid |
| D440,877 S | 4/2001 | Lichtman et al. |
| 6,209,710 B1 | 4/2001 | Mueller et al. |
| 6,213,325 B1 | 4/2001 | Cheng et al. |
| 6,217,818 B1 | 4/2001 | Collette et al. |
| 6,228,317 B1 | 5/2001 | Smith et al. |
| 6,230,912 B1 | 5/2001 | Rashid |
| 6,248,413 B1 | 6/2001 | Barel et al. |
| 6,253,809 B1 | 7/2001 | Paradies |
| 6,273,282 B1 | 8/2001 | Ogg et al. |
| 6,277,321 B1 | 8/2001 | Vailliencourt et al. |
| 6,298,638 B1 | 10/2001 | Bettle |
| D450,595 S | 11/2001 | Ogg et al. |
| 6,354,427 B1 | 3/2002 | Pickel et al. |
| 6,375,025 B1 | 4/2002 | Mooney |
| 6,390,316 B1 | 5/2002 | Mooney |
| 6,413,466 B1 | 7/2002 | Boyd et al. |
| 6,439,413 B1 | 8/2002 | Prevot et al. |
| 6,460,714 B1 | 10/2002 | Silvers et al. |
| 6,467,639 B2 | 10/2002 | Mooney |
| 6,485,669 B1 | 11/2002 | Boyd et al. |
| 6,494,333 B2 | 12/2002 | Sasaki et al. |
| 6,502,369 B1 | 1/2003 | Andison et al. |
| 6,514,451 B1 | 2/2003 | Boyd et al. |
| 6,585,123 B1 | 7/2003 | Pedmo et al. |
| 6,585,124 B2 | 7/2003 | Boyd et al. |
| 6,595,380 B2 | 7/2003 | Silvers |
| 6,612,451 B2 | 9/2003 | Tobias et al. |
| 6,635,217 B1 | 10/2003 | Britton |
| D482,976 S | 12/2003 | Melrose |
| 6,662,960 B2 | 12/2003 | Hong et al. |
| 6,676,883 B2 | 1/2004 | Hutchinson et al. |
| D492,201 S | 6/2004 | Pritchett et al. |
| 6,749,075 B2 | 6/2004 | Bourque et al. |
| 6,749,780 B2 | 6/2004 | Tobias |
| 6,763,968 B1 | 7/2004 | Boyd et al. |
| 6,763,969 B1 | 7/2004 | Melrose et al. |
| 6,769,561 B2 | 8/2004 | Futral et al. |
| 6,779,673 B2 | 8/2004 | Melrose et al. |
| 6,796,450 B2 | 9/2004 | Prevot et al. |
| 6,920,992 B2 | 7/2005 | Lane et al. |
| 6,923,334 B2 | 8/2005 | Melrose et al. |
| 6,929,138 B2 | 8/2005 | Melrose et al. |
| 6,932,230 B2 | 8/2005 | Pedmo et al. |
| 6,942,116 B2 | 9/2005 | Lisch et al. |
| 6,974,047 B2 | 12/2005 | Kelley et al. |
| 6,983,858 B2 | 1/2006 | Slat et al. |
| 7,051,073 B1 | 5/2006 | Dutta |
| 7,051,889 B2 | 5/2006 | Boukobza |
| D522,368 S | 6/2006 | Darr et al. |
| 7,073,675 B2 | 7/2006 | Trude |
| 7,077,279 B2 | 7/2006 | Melrose |
| 7,080,747 B2 | 7/2006 | Lane et al. |
| D531,910 S | 11/2006 | Melrose |
| 7,137,520 B1 | 11/2006 | Melrose |
| 7,140,505 B2 | 11/2006 | Roubal et al. |
| 7,150,372 B2 | 12/2006 | Lisch et al. |
| D535,884 S | 1/2007 | Davis et al. |
| 7,159,374 B2 | 1/2007 | Abercrombie, III et al. |
| D538,168 S | 3/2007 | Davis et al. |
| D547,664 S | 7/2007 | Davis et al. |
| 7,334,695 B2 | 2/2008 | Bysick et al. |
| 7,350,657 B2 | 4/2008 | Eaton et al. |
| D572,599 S | 7/2008 | Melrose |
| 7,416,089 B2 | 8/2008 | Kraft et al. |
| D576,041 S | 9/2008 | Melrose et al. |
| 7,451,886 B2 | 11/2008 | Lisch et al. |
| 7,543,713 B2 | 6/2009 | Trude et al. |
| 7,552,834 B2 | 6/2009 | Tanaka et al. |
| 7,574,846 B2 | 8/2009 | Sheets et al. |
| 7,694,842 B2 | 4/2010 | Melrose |
| 7,726,106 B2 | 6/2010 | Kelley et al. |
| 7,735,304 B2 | 6/2010 | Kelley et al. |
| 7,748,551 B2 | 7/2010 | Gatewood et al. |
| D623,952 S | 9/2010 | Yourist et al. |
| 7,799,264 B2 | 9/2010 | Trude |
| 7,882,971 B2 | 2/2011 | Kelley et al. |
| 7,900,425 B2 | 3/2011 | Bysick et al. |
| 7,926,243 B2 | 4/2011 | Kelley et al. |
| D637,495 S | 5/2011 | Gill et al. |
| D637,913 S | 5/2011 | Schlies et al. |
| D641,244 S | 7/2011 | Bysick et al. |
| 7,980,404 B2 | 7/2011 | Trude et al. |
| 8,011,166 B2 | 9/2011 | Sheets et al. |
| 8,017,065 B2 | 9/2011 | Trude et al. |
| D646,966 S | 10/2011 | Gill et al. |
| 8,028,498 B2 | 10/2011 | Melrose |
| 8,075,833 B2 | 12/2011 | Kelley |
| D653,119 S | 1/2012 | Hunter et al. |
| 8,096,098 B2 | 1/2012 | Kelley et al. |
| D653,550 S | 2/2012 | Hunter |
| D653,957 S | 2/2012 | Yourist et al. |
| 8,162,655 B2 | 4/2012 | Trude et al. |
| 8,171,701 B2 | 5/2012 | Kelley et al. |
| 8,235,704 B2 | 8/2012 | Kelley |
| 8,323,555 B2 | 12/2012 | Trude et al. |
| 2001/0035391 A1 | 11/2001 | Young et al. |
| 2002/0063105 A1 | 5/2002 | Darr et al. |
| 2002/0074336 A1 | 6/2002 | Silvers |
| 2002/0096486 A1 | 7/2002 | Bourquet et al. |
| 2002/0153343 A1 | 10/2002 | Tobias et al. |
| 2002/0158038 A1 | 10/2002 | Heisel et al. |
| 2003/0015491 A1 | 1/2003 | Melrose et al. |
| 2003/0186006 A1 | 10/2003 | Schmidt et al. |

(56) References Cited

U.S. PATENT DOCUMENTS

| | | |
|---|---|---|
| 2003/0196926 A1 | 10/2003 | Tobias et al. |
| 2003/0205550 A1 | 11/2003 | Prevot et al. |
| 2003/0217947 A1 | 11/2003 | Ishikata et al. |
| 2004/0000533 A1 | 1/2004 | Kaminineni et al. |
| 2004/0016716 A1 | 1/2004 | Melrose et al. |
| 2004/0074864 A1 | 4/2004 | Melrose et al. |
| 2004/0129669 A1 | 7/2004 | Kelley et al. |
| 2004/0149677 A1 | 8/2004 | Slat et al. |
| 2004/0173565 A1 | 9/2004 | Semersky et al. |
| 2004/0212746 A1 | 10/2004 | Rosen |
| 2004/0232103 A1 | 11/2004 | Lisch et al. |
| 2005/0035083 A1 | 2/2005 | Pedmo et al. |
| 2005/0211662 A1 | 9/2005 | Eaton et al. |
| 2005/0218108 A1 | 10/2005 | Bangi et al. |
| 2006/0006133 A1 | 1/2006 | Lisch et al. |
| 2006/0051541 A1 | 3/2006 | Steele |
| 2006/0138074 A1 | 6/2006 | Melrose |
| 2006/0151425 A1 | 7/2006 | Kelley et al. |
| 2006/0231985 A1 | 10/2006 | Kelley |
| 2006/0243698 A1 | 11/2006 | Melrose |
| 2006/0255005 A1 | 11/2006 | Melrose et al. |
| 2006/0261031 A1 | 11/2006 | Melrose |
| 2007/0017892 A1 | 1/2007 | Melrose |
| 2007/0045222 A1 | 3/2007 | Denner et al. |
| 2007/0045312 A1 | 3/2007 | Abercrombie, III et al. |
| 2007/0051073 A1 | 3/2007 | Kelley et al. |
| 2007/0084821 A1 | 4/2007 | Bysick et al. |
| 2007/0125742 A1 | 6/2007 | Simpson, Jr. et al. |
| 2007/0125743 A1 | 6/2007 | Pritchett, Jr. et al. |
| 2007/0131644 A1 | 6/2007 | Melrose |
| 2007/0181403 A1 | 8/2007 | Sheets et al. |
| 2007/0199915 A1 | 8/2007 | Denner et al. |
| 2007/0199916 A1 | 8/2007 | Denner et al. |
| 2007/0215571 A1 | 9/2007 | Trude |
| 2007/0235905 A1 | 10/2007 | Trude et al. |
| 2008/0047964 A1 | 2/2008 | Denner et al. |
| 2008/0156847 A1 | 7/2008 | Hawk et al. |
| 2008/0257856 A1 | 10/2008 | Melrose et al. |
| 2009/0090728 A1 | 4/2009 | Trude et al. |
| 2009/0091067 A1 | 4/2009 | Trude et al. |
| 2009/0092720 A1 | 4/2009 | Trude et al. |
| 2009/0120530 A1 | 5/2009 | Kelley et al. |
| 2009/0134117 A1 | 5/2009 | Mooney |
| 2009/0202766 A1 | 8/2009 | Beuerle et al. |
| 2009/0293436 A1 | 12/2009 | Miyazaki et al. |
| 2010/0018838 A1 | 1/2010 | Kelley et al. |
| 2010/0116778 A1 | 5/2010 | Melrose |
| 2010/0133228 A1 | 6/2010 | Trude |
| 2010/0163513 A1 | 7/2010 | Pedmo |
| 2010/0170199 A1 | 7/2010 | Kelley et al. |
| 2010/0213204 A1 | 8/2010 | Melrose |
| 2010/0237083 A1 | 9/2010 | Trude et al. |
| 2010/0301058 A1 | 12/2010 | Trude et al. |
| 2011/0049083 A1 | 3/2011 | Scott et al. |
| 2011/0049084 A1 | 3/2011 | Yourist et al. |
| 2011/0084046 A1 | 4/2011 | Schlies et al. |
| 2011/0094618 A1 | 4/2011 | Melrose |
| 2011/0108515 A1 | 5/2011 | Gill et al. |
| 2011/0113731 A1 | 5/2011 | Bysick et al. |
| 2011/0132865 A1 | 6/2011 | Hunter et al. |
| 2011/0147392 A1 | 6/2011 | Trude et al. |
| 2011/0210133 A1 | 9/2011 | Melrose et al. |
| 2011/0266293 A1 | 11/2011 | Kelley et al. |
| 2011/0284493 A1 | 11/2011 | Yourist et al. |
| 2012/0104010 A1 | 5/2012 | Kelley |
| 2012/0132611 A1 | 5/2012 | Trude et al. |
| 2012/0152964 A1 | 6/2012 | Kelley et al. |
| 2012/0240515 A1 | 9/2012 | Kelley et al. |
| 2012/0266565 A1 | 10/2012 | Trude et al. |
| 2012/0267381 A1 | 10/2012 | Trude et al. |
| 2013/0000259 A1 | 1/2013 | Trude et al. |

FOREIGN PATENT DOCUMENTS

| | | |
|---|---|---|
| DE | 1761753 | 1/1972 |
| DE | P2102319.8 | 8/1972 |
| DE | 3215866 A1 | 11/1983 |
| EP | 225 155 A2 | 6/1987 |
| EP | 225155 A2 | 6/1987 |
| EP | 346518 A1 | 12/1989 |
| EP | 0 502 391 A2 | 9/1992 |
| EP | 0 505054 A1 | 9/1992 |
| EP | 0521642 A1 | 1/1993 |
| EP | 0 551 788 A1 | 7/1993 |
| EP | 0666222 A1 | 2/1994 |
| EP | 0 739 703 | 10/1996 |
| EP | 0 609 348 B1 | 2/1997 |
| EP | 0916406 A2 | 5/1999 |
| EP | 0957030 A2 | 11/1999 |
| EP | 1 063 076 A1 | 12/2000 |
| FR | 1571499 | 6/1969 |
| FR | 2607109 | 5/1988 |
| GB | 781103 | 8/1957 |
| GB | 1113988 | 5/1968 |
| GB | 2 050 919 A | 1/1981 |
| GB | 2372977 A | 9/2002 |
| JP | 48-31050 | 9/1973 |
| JP | 49-28628 | 7/1974 |
| JP | 54-72181 A | 6/1979 |
| JP | S54-70185 | 6/1979 |
| JP | 56-56830 A | 5/1981 |
| JP | 56-72730 U | 6/1981 |
| JP | 57-210829 A | 1/1982 |
| JP | S57-17730 | 1/1982 |
| JP | 57-37827 | 2/1982 |
| JP | 57-37827 U | 2/1982 |
| JP | 57-126310 | 8/1982 |
| JP | 61-192539 A | 8/1986 |
| JP | 63-189224 A | 8/1988 |
| JP | 64-004662 | 2/1989 |
| JP | 3-43342 | 2/1991 |
| JP | 3-43342 A | 2/1991 |
| JP | 03-076625 A | 4/1991 |
| JP | 4-10012 | 1/1992 |
| JP | 5-193694 | 8/1993 |
| JP | 53-10239 A | 11/1993 |
| JP | 06-270235 A | 9/1994 |
| JP | 6-336238 A | 12/1994 |
| JP | 07-300121 A | 11/1995 |
| JP | H08-048322 | 2/1996 |
| JP | 08-244747 A | 9/1996 |
| JP | 8-253220 A | 10/1996 |
| JP | 8-282633 A | 10/1996 |
| JP | 09-001639 A | 1/1997 |
| JP | 09-039034 A | 2/1997 |
| JP | 9-110045 A | 4/1997 |
| JP | 10-167226 A | 6/1998 |
| JP | 10-181734 A | 7/1998 |
| JP | 10-230919 A | 9/1998 |
| JP | 3056271 | 11/1998 |
| JP | 11-218537 A | 8/1999 |
| JP | 2000-229615 A | 8/2000 |
| JP | 2002-127237 | 5/2002 |
| JP | 2002-2160717 A | 6/2002 |
| JP | 2002-326618 A | 11/2002 |
| JP | 2003-095238 | 4/2003 |
| JP | 2004-026307 A | 1/2004 |
| JP | 2006-501109 | 1/2006 |
| JP | 2007-216981 A | 8/2007 |
| JP | 2008-189721 A | 8/2008 |
| NZ | 240448 | 6/1995 |
| NZ | 296014 | 10/1998 |
| NZ | 335565 | 10/1999 |
| NZ | 506684 | 9/2001 |
| NZ | 512423 | 9/2001 |
| NZ | 521694 | 10/2003 |
| WO | WO 93/09031 A1 | 5/1993 |
| WO | WO 93/12975 A1 | 7/1993 |
| WO | WO 94/05555 | 3/1994 |
| WO | WO 94/06617 | 3/1994 |
| WO | WO 97/03885 | 2/1997 |

(56) References Cited

FOREIGN PATENT DOCUMENTS

| WO | WO 97/14617 | 4/1997 |
|---|---|---|
| WO | WO 97/34808 | 9/1997 |
| WO | WO 97/34808 A1 | 9/1997 |
| WO | WO 99/21770 | 5/1999 |
| WO | WO 00/38902 A1 | 7/2000 |
| WO | WO 00/51895 A1 | 9/2000 |
| WO | WO 01/12531 A1 | 2/2001 |
| WO | WO 01/40081 A1 | 6/2001 |
| WO | WO 01/74689 A1 | 10/2001 |
| WO | WO 02/02418 A1 | 1/2002 |
| WO | WO 02/18213 A1 | 3/2002 |
| WO | WO 02/085755 A1 | 10/2002 |
| WO | WO 2004/028910 A1 | 4/2004 |
| WO | WO 2004/106175 A1 | 12/2004 |
| WO | WO 2004/106176 A2 | 12/2004 |
| WO | WO 2005/012091 A2 | 2/2005 |
| WO | WO 2005/025999 A1 | 3/2005 |
| WO | WO 2005/087628 A1 | 9/2005 |
| WO | WO 2006/113428 A2 | 10/2006 |
| WO | WO 2007/047574 A1 | 4/2007 |
| WO | WO 2007/127337 A2 | 11/2007 |
| WO | WO 2010/058098 A2 | 5/2010 |

OTHER PUBLICATIONS

U.S. Appl. No. 13/251,966, filed Oct. 3, 2011, Howell et al.
U.S. Appl. No. 13/210,358, filed Aug. 15, 2011, Wurster et al.
U.S. Appl. No. 13/410,902, filed Mar. 2, 2012, Gill.
Contents of U.S. Appl. No. 60/220,326, filed Jul. 24, 2000 dated Oct. 29, 2008.
International Search Report for PCT/US2005/008374 dated Aug. 2, 2005.
IPRP (including Written Opinion) for PCT/US2005/008374 dated Sep. 13, 2006.
International Search Report for PCT/US2004/016405 dated Feb. 15, 2005.
IPRP (including Written Opinion) for PCT/US2004/016405 dated Nov. 25, 2005.
Office Action for Application No. EP 06 750 165.0-2307 dated Nov. 24, 2008.
International Search Report for PCT/US2006/040361 dated Feb. 26, 2007.
IPRP (including Written Opinion) for PCT/US2006/040361 dated Apr. 16, 2008.
International Search Report for PCT/US2007/006318 dated Sep. 11, 2007.
IPRP (including Written Opinion) PCT/US2007/006318 dated Sep. 16, 2008.
IPRP (including Written Opinion) PCT/US2006/014055 dated Oct. 16, 2007.
International Search Report for PCT/US2004/024581 dated Jul. 25, 2005.
IPRP (including Written Opinion) for PCT/US2004/024581 dated Jan. 30, 2006.
Official Notification for counterpart Japanese Application No. 2006-522084 dated May 19, 2009.
Examination Report for counterpart New Zealand Application No. 545528 dated Jul. 1, 2008.
Examination Report for counterpart New Zealand Application No. 569422 dated Jul. 1, 2008.
Examination Report for New Zealand Application No. 550336 dated Mar. 26, 2009.
Examination Report for counterpart New Zealand Application No. 545528 dated Sep. 20, 2007.
Examination Report for counterpart New Zealand Application No. 569422 dated Sep. 29, 2009.
Office Action for Chinese Application No. 2006800380748 dated Jul. 10, 2009.
Examiner's Report for Australian Application No. 2006236674 dated Sep. 18, 2009.
Examiner's Report for Australian Application No. 2006236674 dated Nov. 6, 2009.
Office Action for Chinese Application No. 200680012360.7 dated Jul. 10, 2009.
Examination Report for New Zealand Application No. 563134 dated Aug. 3, 2009.
Office Action for European Application No. 07752979.0-2307 dated Aug. 21, 2009.
"Application and Development of PET Plastic Bottle," Publication of Tsinghad Tongfang Optical Disc Co. Ltd., Issue 4, 2000, p. 41. (No English language translation available).
International Search Report for PCT/US2006/014055 dated Dec. 7, 2006.
International Search Report and Written Opinion dated Mar. 15, 2010 for PCT/US2010/020045.
International Search Report and Written Opinion dated Sep. 8, 2009 for PCT/US2009/051023.
Chanda, M. & Roy, Salil K., Plastics Technology Handbook, Fourth Edition, 2007, CRC Press, Taylor & Francis Group, pp. 2-24-2-37.
Office Action dated Feb. 3, 2010 for Canadian Application No. 2,604,231.
Communication dated Mar. 9, 2010 for European Application No. 09 173 607.4 enclosing European search report and European search opinion dated Feb. 25, 2010.
European Search Report for EPA 10185697.9 dated Mar. 21, 2011.
International Search report dated Apr. 21, 2010 from corresponding PCT/US2009/066191 filed Dec. 1, 2009.
International Preliminary Report on Patentability and Written Opinion dated Jun. 14, 2011 for PCT/US2009/066191. 7 pages.
Office Action, Japanese Application No. 2008-506738 dated Aug. 23, 2011.
Extended European Search Report for EPA 10185697.9 dated Jul. 6, 2011.
Patent Abstracts of Japan, vol. 012, No. 464; Dec. 6, 1988.
Patent Abstracts of Japan, vol. 2002, No. 09, Sep. 4, 2002.
Patent Abstracts of Japan, vol. 015, No. 239, Jun. 20, 1991.
Examination Report dated Jul. 25, 2012, in New Zealand Patent Application No. 593486.
Taiwanese Office Action dated Jun. 10, 2012, Application No. 095113450.
Japanese First Notice of Reasons for Rejection dated Aug. 23, 2011, in Application No. 2008-506738.
Japanese Second Notice of Reasons for Rejection dated Jun. 11, 2012, in Application No. 2008-506738.
Office Action dated Aug. 14, 2012, in Japanese Patent Application No. 2008-535769.
Examiner's Report dated Feb. 15, 2011 in Application No. AU200630483.
Office Action dated Oct. 31, 2011, in Australian Patent Application No. 2011203263.
Office Action dated Jul. 19, 2011, in Japanese Patent Application No. 2008-535769.
Office Action dated Dec. 6, 2011, in Japanese Patent Application No. 2008-535769.
International Search Report and Written Opinion for PCT/US2012/050251 dated Nov. 16, 2012.
International Search Report and Written Opinion for PCT/US2012/050256 dated Dec. 6, 2012.
Requisition dated Feb. 3, 2010 for Canadian Application No. 2,604,231.
Requisition dated Jan. 9, 2013 for Canadian Application No. 2,559,319.
Office Action dated Feb. 5, 2013, in Mexican Patent Application No. MX/a/2008/004703.
Office Action dated Jul. 26, 2010 for Canadian Application No. 2,527,001.
Australian Office Action dated Mar. 3, 2011 in Application No. 2010246525.
Australian Office Action dated Nov. 8, 2011, in Application No. 2011205106.
Examiner Report dated May 26, 2010, in Australian Application No. 2004261654.

(56) References Cited

OTHER PUBLICATIONS

Examiner Report dated Jul. 23, 2010, in Australian Application No. 2004261654.
Requisition dated May 25, 2010 for Canadian Application No. 2,534,266.
Communication dated Jun. 16, 2006, for European Application No. 04779595.0.
Final Official Notification dated Mar. 23, 2010 for Japanese Application No. 2006-522084.
International Search Report and Written Opinion dated Dec. 18, 2012, in PCT/US12/056330.

* cited by examiner

COMPRESSION MOLDED PREFORM FOR FORMING INVERTIBLE BASE HOT-FILL CONTAINER, AND SYSTEMS AND METHODS THEREOF

FIELD

The disclosed subject matter generally relates to compression molded preforms and systems and methods thereof, including resultant containers formed by such compression molded preforms. More specifically, the disclosed subject matter relates to compression molded preforms that form containers with bottom end portions that are movable, for example invertible, upon being subjected to hot-fill, hot-fill related, and/or elevated temperature operations.

SUMMARY

Various embodiments (i.e., one, some, or all) of the disclosed subject matter relate to a compression molded plastic preform for forming a blow molded plastic container having an invertible base portion, the preform having a hollow body defining an inner volume. The preform body can comprise: a first, open end defining an opening into the inner volume, the first end having threads; a second, closed end opposite the first end in a length-wise direction of the preform body; and an intermediate portion between the first end and the second end, the intermediate portion having a sidewall extending in the length-wise direction of the preform body along a central longitudinal axis of the preform body. The second end of the preform body is gateless and optionally without a weld line. More specifically, a portion of the second end located at the central longitudinal axis of the preform body is gateless and optionally without a weld line. In various embodiments the second end is generally hemispherical, with an entirety of an outer surface of the second hemispherical end being smooth and an entirety of an inner surface of the second hemispherical end being smooth and without any sharp transitions. Optionally, the second end has a portion that is thinner than any other portion of the preform. The preform body can include a transition portion formed on an outer surface of the preform body where the intermediate portion meets the second end. The transition portion may transition from the sidewall of the intermediate portion along a first radius of a first direction to a portion of the second end along a second radius of a second direction substantially opposite the first direction.

In various embodiments, an entirety of an inner surface of the second hemispherical end is smooth and without sharp transitions except for a protruding portion that is formed at the central longitudinal axis and protrudes inward into the inner volume of the preform body. The protruding portion can be configured to mate with a stretch rod during stretching of the container during the blow molding process in order to maintain the stretch rod substantially centered at the central longitudinal axis. Further, in various embodiments, the entirety of the second end can be configured to be oriented during a blow molding operation to form the blow molded container. Optionally, the portion of the second end that is thinner than any other portion of the preform is the entire second end. In various embodiments, the second end has a portion at the central longitudinal axis that is the thinnest portion of the preform. Optionally, a minimum thickness of the second end is 50% or less than a maximum thickness of the sidewall.

In various embodiments, the first radius of the transition portion is less than the second radius of the portion of the second end, wherein the first direction of the first radius is generally inward and the direction of the second radius being generally outward. The configuration of the transition portion can assist with thinning of the base portion during blow molding. Further, in various embodiments, the transition portion can be configured to form a standing surface for the blow molded container and the second end can be configured to form the invertible base portion. In various embodiments, the base portion can be invertible in response to internal pressures experienced by the container upon hot-filling and cooling. In various embodiments, the transition portion is configured to form a standing surface for the blow molded container, the second end is configured to form the invertible base portion, and the base portion is configured to be mechanically inverted to reduce a vacuum created in a hot-filled and cooled sealed container. Optionally, the second end is configured to form the invertible base portion, wherein the base portion can be configured to pull inward under vacuum pressure during hot-fill and cooling operations.

Various embodiments also include a system comprising means for forming a compression molded plastic preform and means for blow molding the compression molded preform to form a blow molded plastic container. The compression molded plastic preform includes a body which can define an inner volume and have a first open end which defines an opening into the inner volume, a second closed end opposite the first end, and a sidewall portion extending from the first end to the second end. The second end of the preform body is gateless and can be rounded, wherein an entirety of an outer surface thereof can be smooth and an entirety of an inner surface of the second end can be smooth and without one or more stepped transitions. Optionally, the second end can have a portion that is thinner than any portion of the sidewall portion. The blow molded plastic container can include a sidewall, a standing portion, and a movable base portion. Optionally, the sidewall can have a thickness greater than the movable base portion, and an entirety of the movable base portion being oriented during the blow molding process.

In various embodiments, the means for forming a compression molded plastic preform can include: means for extruding a rod of plastic material; means for cutting the rod of plastic material to a desired length; means for transferring the plastic material of a desired length forming; and means for compression molding a molten billet produced by heating of the transferred plastic material. The means for compression molding can include a mold cavity and a mold top with a core mold, wherein the mold cavity and core mold are of respective geometries to form the compression molded plastic preform. In various embodiments, the system can further comprise means for hot-filling the blow molded container with a product; means for sealing the hot-filled container; means for cooling the hot-filled and sealed container; and means for reducing a vacuum in the container. In various embodiments, the means for reducing a vacuum can include inward movement of the movable base portion. Optionally, in various embodiments, the formed plastic container may be free of any vacuum panels on its sidewall.

Various embodiments also can include a method comprising providing a predetermined amount of plastic material and compression molding the amount of plastic material to form a plastic preform. The plastic preform can have a geometry to form a blow molded container with a bottom end base portion that is invertible to compensate for an induced vacuum in the container caused by hot-filling and cooling operations. The preform has a body defining an inner volume and comprising: an open end defining an opening into the inner volume; a closed end opposite the open end in a length-wise direction of the preform body; and a sidewall between the open and closed ends that extends in the length-wise direction of the preform body along a central longitudinal axis thereof. The closed end of the preform body is gateless and can be rounded, wherein an entirety of an outer surface of the closed end can be smooth, and an entirety of an inner surface of the closed end may also be smooth. In various embodiment, the sidewall has a first thickness immediately adjacent a transition portion between the sidewall and the closed end, the transition portion has a thickness less than the immediately adjacent sidewall portion, and the closed end has a thickness that decreases from the thickness of the transition portion to a minimum thickness of the preform at the central longitudinal axis of the preform body.

In various embodiments, the method can further comprise blow molding said compression molded plastic preform to form a blow molded plastic container. The blow molded container can have a sidewall formed based on the configuration of the sidewall of the preform, a support structure for supporting the container in an upright position on a flat surface, the support structure being formed based on the configuration of said transition portion, and a movable base portion that is formed based on the configuration of the closed end of the preform, the center of the movable base portion at the central longitudinal axis being oriented as a result of the blow molding operation. Optionally, the movable portion can be initially formed at a downward angle with respect to the horizontal. The movable base portion can be configured to move in response to internal forces within the container. Optionally, in various embodiments the movable portion can be at all times at or above a plane running through a bottom most portion of the support structure. In various embodiments, the movable base portion can be caused to be pulled inward toward the interior of the container in response to a hot-filling and cooling operation. Further, optionally, the entirety of the inner surface of the closed end may be void of stepped or sharp transitions.

BRIEF DESCRIPTION OF THE DRAWINGS

The accompanying drawings illustrate embodiments of the disclosed subject matter. The disclosed subject matter will be best understood by reading the ensuing specification in conjunction with the drawing figures, in which like elements are designated by like reference numerals, and wherein.

DETAILED DESCRIPTION

Generally speaking, various embodiments of the disclosed subject matter involve compression molded preforms for forming invertible base hot-fill containers, and systems and methods thereof, including resultant containers formed by such compression molded preforms.

A preform according to various embodiments of the disclosed subject matter includes a body with a first open end, a second closed end or end cap of hemispherical shape, for example, and a sidewall extending between the first end and the second end. At least a portion of the closed end can be thinner than any portion of the sidewall. Alternatively, the closed end and the sidewall can be of substantially the same thickness, or have portions thereof of substantially the same thickness. Further, the closed end is gateless and can have an inner surface that is substantially smooth along its entire area. The compression molded preform may be blow molded to form a plastic container with an invertible or movable base. The invertible or movable base can be responsive to or moved based on internal forces or pressures associated with processing the container, such as hot-filling and cooling and/or elevating the temperature of the contents after filling and capping (e.g., pasteurization).

Figure 1:
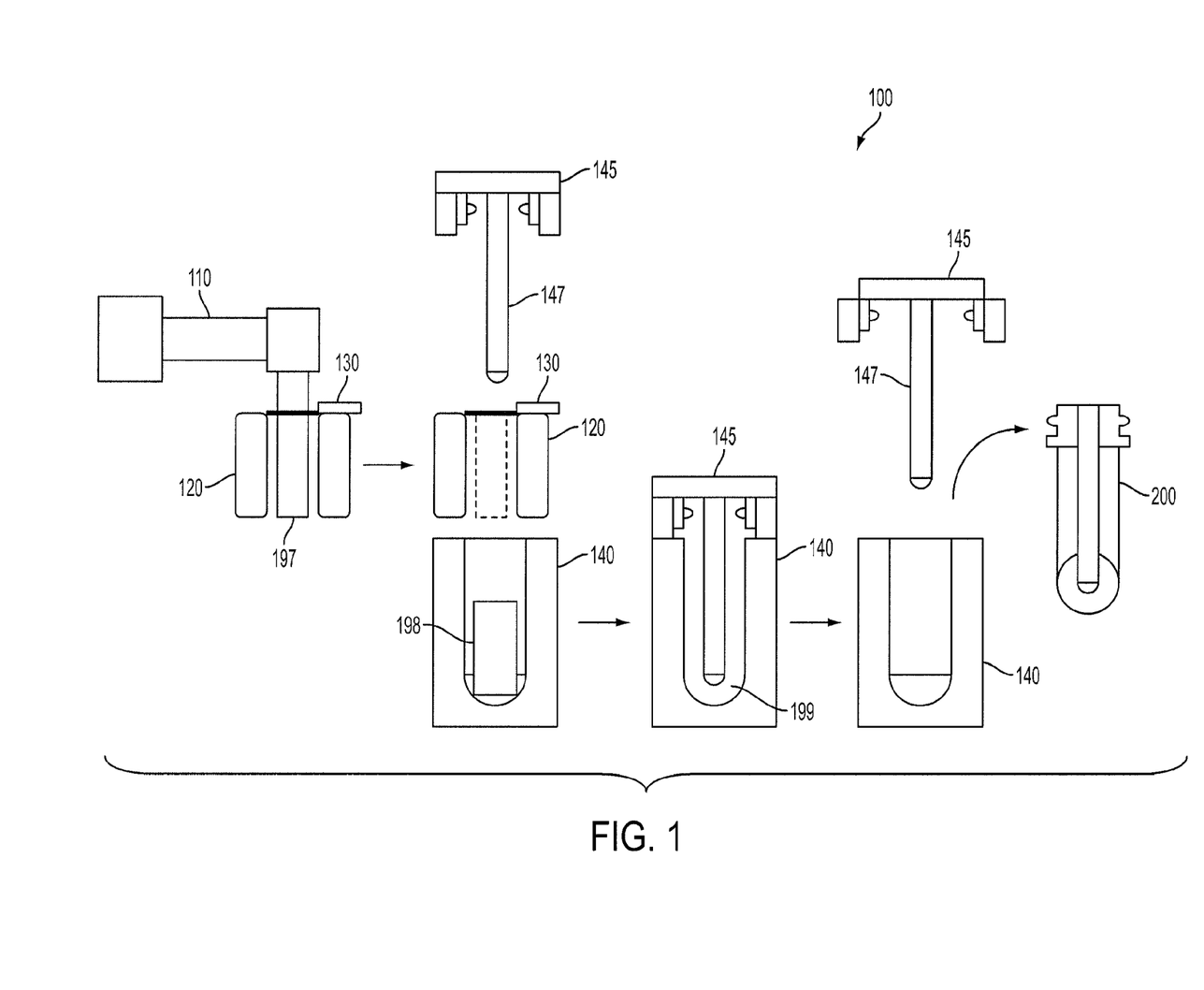
FIG. 1 shows a system for forming a preform by compression molding according to various embodiments of the disclosed subject matter.

FIG. 1 shows a system 100 for forming a compression molded plastic preform according to various embodiments of the disclosed subject matter, wherein the preform is configured to form a subsequent container with a movable portion at a bottom end thereof. System 100 is shown as having a general flow from left to right on the page representing a sequence of operations for forming the compression molded preform according to various embodiments of the disclosed subject matter.

Generally speaking, compression molding includes placing a preheated polymer into an open, heated mold cavity, closing a mold top over the mold cavity to encase the preheated polymer, and then applying pressure (and heat) to force the material to contact all areas of the mold. Throughout the process, heat and pressure may be maintained until the polymer has cured. Heat and pressure may be varied or set at different values for different parts of the preform, depending, for example, upon a thickness or a thinness of a particular portion of the preform.

System 100 can include an extruder 110 including a die nozzle for extruding a rod of plastic material to be formed by compression molding into a desired plastic preform. The plastic can be extruded in any suitable shape, form, or amount, such as in a ½" diameter rod 197 of plastic material at a weight of 37.5 g, for example. In various embodiments the amount of plastic material is chosen based on an inner volume and/or surface characteristics of the mold. The plastic material can be any suitable material, including thermosets or thermoplastics, such as polyethylene terephthalate ("PET"). Though a rod of material has been discussed above, the plastic can be provided in any suitable format, such as plastic pellets or a sheet of plastic material, in which case the system's extruder 110 would be replaced with a suitable alternative for supplying plastic material of a particular form.

In various embodiments, the plastic material can be extruded from extruder 110 to a holder 120. Alternatively, the plastic material can be extruded directly to a mold cavity. As shown in FIG. 1, the rod 197 of plastic material is extruded to holder 120. A separating apparatus 130, for instance a cutter or a pinch-off device, may be used to separate the plastic material from the output of the extruder 110. The holder 120 may be used to transport or transfer the rod 197 of plastic material to a cavity of a mold 140. Alternatively, the rod 197 of plastic material may be deposited directly from the extruder into the cavity of mold 140.

Once the rod 197 of plastic material is deposited in the cavity of mold 140, the plastic material is heated to form a molten billet 198. A mold top 145 is closed over mold 140 to encase the molten billet 198. The mold top 145 can include a core mold portion 147 that forms the inner volume of the preform. The molten billet is subjected to heat and pressure to force the material to contact all areas of the mold 140 and mold top 145 (including core mold portion 147). Pressure and optionally heat may be maintained until the polymer has cured. As noted above, heat and/or pressure may be varied or set to different values for different parts of the preform, depending, for example, upon a thickness or thinness of a particular portion of the preform. The cured plastic material can be allowed to cool, the mold top 145 is opened, and preform 200 is removed from the mold. Preforms according to various embodiments of the disclosed subject matter can have respective thicknesses of their sidewalls and closed ends relatively close in value, as will be discussed in more detail below. Thus, in various embodiments, because the thicknesses of the sidewall and the closed end are relatively close, compression molding of the preform may be performed more easily, because differences in temperature and pressure are not as significant for the different areas and pressure and temperature regulation can be improved or more easily controlled.

Figure 2A:
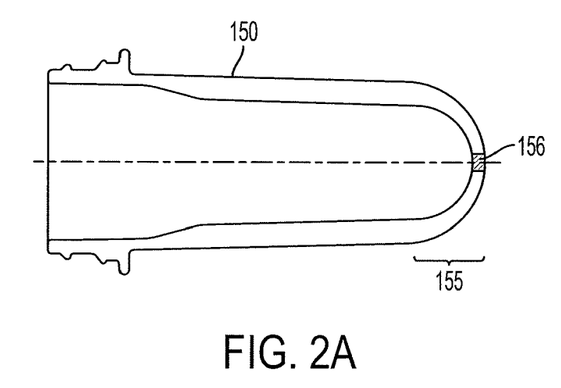
FIG. 2A is a side, cross section view of an injection molded preform.
Figure 2B:
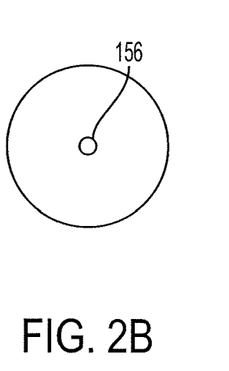
FIG. 2B is a front view of a closed end of the injection molded preform of FIG. 2A.
Figure 2C:
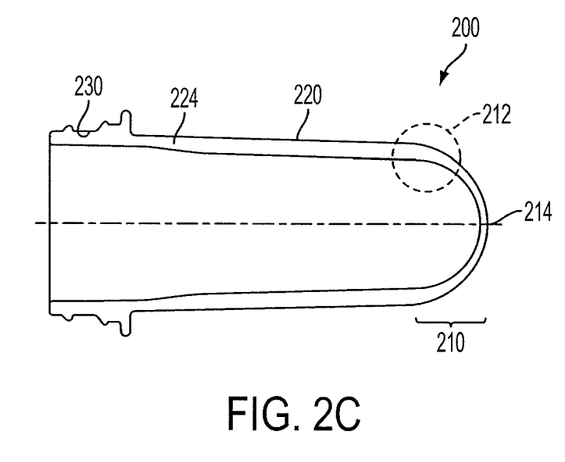
FIG. 2C is side, cross section view of a compression molded preform according to various embodiments of the disclosed subject matter.
Figure 2D:
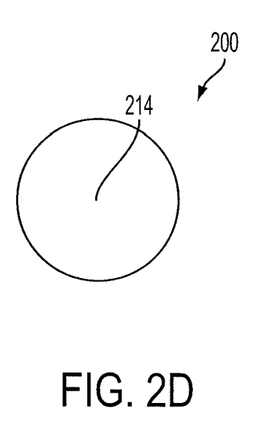
FIG. 2D is a front view of a closed end of the compression molded preform of FIG. 2C.
Figure 4A:
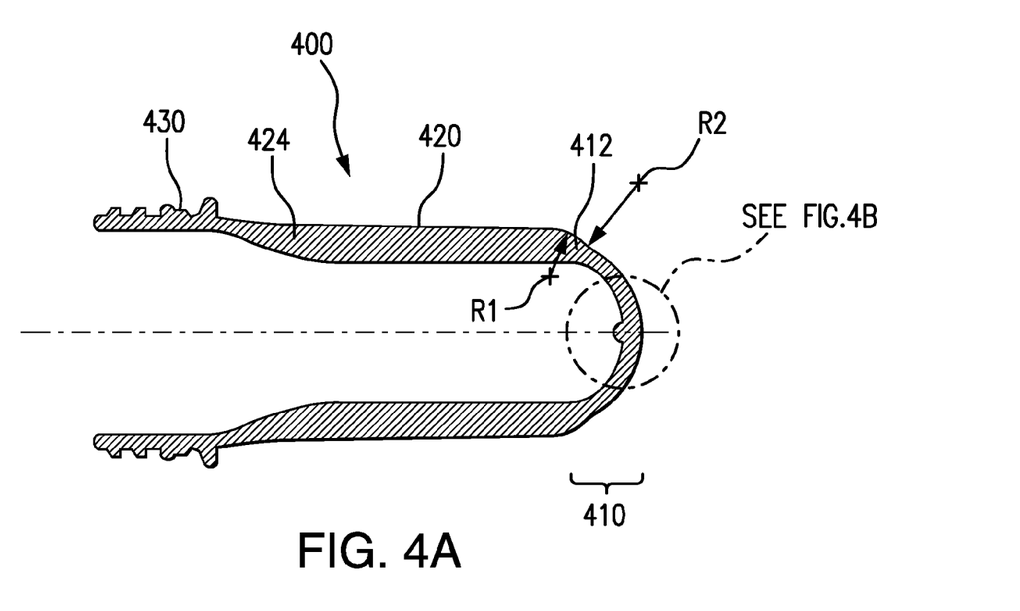
FIG. 4A is side, cross section view of a compression molded preform according to various embodiments of the disclosed subject matter.

In various embodiments, the cavity of mold 140, the mold top 145, and the core mold portion 147 have respective geometries to form compression molded plastic preforms according to various embodiments of the disclosed subject matter, such as those shown in FIGS. 2C, 2D, and 4A.

Systems according to various embodiments of the disclosed subject matter also can include a blow molder that blow molds compression molded preforms according to various embodiments of the disclosed subject matter into blow molded containers, such as bottles and jars. In various embodiments, preforms according to various embodiments of the disclosed subject matter can form containers with movable base portions, which can be moved based on internal pressures of the filled container. The blow molder can perform blow molding in any suitable fashion, such as by injection blow molding or stretch blow molding.

Systems according to various embodiments of the disclosed subject matter also can include a filling apparatus that fills the blow molded container with a consumable product, for example, a fluid, such as a liquid (e.g., water, soda, tea, applesauce, etc.). Optionally, the product can be hot-filled into the container. After filling, the container can be sealed by any suitable means, using any suitable seal, such as a snap fit top, a twist or screw on top or cap, etc. In various embodiments, the top or cap is configured to mate with the structure of the open end of the preform and blow molded container. For example, the cap or top may have threads which cooperate with threads of the preform and blow molded container to seal the container. In the case of a hot-filled container, the contents of the container may be allowed to cool to ambient temperature on their own or cooled by a specific cooling apparatus, such as a refrigerator, waterspray, fans, or the like.

Upon hot-filling the container and/or upon sealing of the hot-filled container, internal forces may be present within the container (e.g., force due to weight of the product, elevated temperatures, etc.). Such forces can be compensated for using a flexible or movable portion at a bottom end of the container base. The movable portion can have a geometry based on the shape and configuration of the compression molded preform and can move in response to an internal force or forces caused by hot-filling of a product into the container. For example, the movable portion may move downward to a desired amount or may move downward no more than a desired amount. Such movement can be based on the hot-filled product, the geometry of the movable portion, and/or the temperature of the hot-filled product.

Upon cooling of the hot-filled container, a vacuum may be induced in the sealed container. In various embodiments the vacuum is compensated for, for example, by reducing it, eliminating it, or creating an overpressure in the container. The vacuum can be compensated for by any suitable means. For example, in various embodiments of the disclosed subject matter, the container base (i.e., the bottom end of the container) can have a flexible or movable portion. Optionally, the flexible or movable portion can be the same as the portion of the container that can move in response to filling and capping a hot-filled container. Alternatively, this flexible or movable portion may be different from the portion of the container that can move in response to filling and capping a hot-filled container, or it can have overlapping features.

The movable portion can have a geometry based on the shape and configuration of the preform and can be movable, for example, inward, to reduce, to eliminate, or to create an overpressure in the container. Optionally, the movable portion can be pulled inward by the force of the vacuum itself. Alternatively, the movable portion may be moved inward by a mechanical apparatus, such as a push rod. In various embodiments the movable portion may be inverted inward, either by the force of the internal vacuum or by a mechanical apparatus. Optionally, the movable bottom end portion is caused to move such that no other portion of the container is caused to move by the induced vacuum. For example, based on the specific configuration and/or respective thicknesses of the movable bottom end portion and the sidewalls of the container, when a vacuum is induced in the container only the movable bottom end portion moves or is caused to move to compensate for the vacuum, and the sidewalls of the container remain substantially unmoved or without deformation.

The movable portion may move upward and/or downward in response to pressure or force variations within the container during various processing operations. In various embodiments, the blow molded container can have a standing surface, and the movable portion's movement may not exceed in a downward direction a plane passing through the standing surface of the container. Thus, a stable standing surface is maintained for the container throughout various processing operations despite the internal pressures and forces and the movement of the movable portion of the container in response thereto.

FIGS. 2A and 2B show side, cross section and front views, respectively, of an injection molded preform. FIGS. 2C and 2D show side, cross section and front views, respectively, of a compression molded preform 200 according to various embodiments of the disclosed subject matter.

Preforms formed by injection molding, such as the one shown in FIGS. 2A and 2B, can be formed by injecting a molten plastic material through a gate into a mold cavity. The preform can be allowed to cool, cure, and set prior to removal of the preform from the mold. Typically the gate is coaxially aligned with the preform body and forms a corresponding gate portion 156 in the closed end 155 of the injection molded preform. Gate marks (not explicitly shown), such as a raised gate mark, also may be formed at gate portion 156. If visible, gate marks may be visually undesirable, and the necessity of a gate in injection molding may result in a relatively thick, closed end, caused by a relatively thicker cavity in the vicinity of the gate in order to ensure sufficient material flow into the cavity. Further, in injection molded preforms the gate portion 156 may be the weakest portion of the preform, for example, due to the crystallinity at this portion. Crystallinity of the gate portion 156 may cause the preform to resist or unsatisfactorily perform stretching or orientation during formation of the container. Additionally, attempts to make a base portion of an injection molded preform too thin relative to its sidewalls may result in a problem that the base may tend to freeze off in the injection press before the sidewalls can be filled.

Preforms made by compression molding, such the preforms 200, 400 shown in FIGS. 2C, 2D, 4A, and 4B, respectively, do not have a gate. As such, a thickened, crystallized gate portion typical for injection molded preforms is not present and problems associated with these gate portions, such as problems caused by the increased crystallinity of the gate portion, can be avoided. For example, because a compression molded preform does not have a gate portion, an entire area of the closed end of the container can be oriented when forming the container.

FIGS. 2C and 2D show a gateless compression molded preform 200 according to various embodiments of the disclosed subject matter. The gateless compression molded preform can be configured to form a blow molded container with a movable or invertible bottom end portion.

The preform 200 includes a body defining an inner volume and having an open end 230 which defines an opening into the inner volume, a closed end 210 opposite the open end in an axial, length-wise direction of the preform body, and a sidewall 220 that extends from the open end 230 to the closed end 210 along a central longitudinal axis of the preform body. In various embodiments, sidewall 220 can have a relatively thin portion 224 adjacent open end 230. Portion 224 may be thinned to form a shoulder portion of the container that leads to the neck and open end of the container.

In various embodiments, the open end 230 can have a cylindrical finish with external threads provided to mate with a closure, such as a cap or lid. In various embodiments, the cylindrical finish can have a ring-shaped flange portion provided, for example, to facilitate handling or further processing of the preform.

As mentioned above, the closed end 210 is gateless. Thus, an end portion 214 of the closed end 210 located at the central longitudinal axis is gateless. Thus, the entirety of the closed end 210, including its center, is configured to be oriented during blow molding operation to form the blow molded container. Further, in various embodiments the closed end 210 is without a weld line, such as a weld line that protrudes from the preform body or otherwise. Closed end 210 can be rounded, for example, in the form of a hemisphere, a half globe, or a dome. Moreover, in various embodiments, an entire or substantially entire outer surface of the closed end can be smooth. The outside of the closed end of the preform can be smooth in order to facilitate removal of the preform 200 from the mold. Closed end 210 is configured to form a movable or invertible base portion of a subsequently formed container.

An inner surface of the closed end 210 also can be rounded, for example, in the form of a hemisphere, a half globe, or a dome. Optionally, the inner surface of the closed end 210 may generally conform to the shape of the outer surface of the closed end 210, varying slightly because of a change in thickness at the closed end 210 in various embodiments, for example. In various embodiments, the inner surface of the closed end 210 can be smooth and without any (i.e., one or more) stepped or sharp transitions or variations in thickness. Optionally, an entirety of the inner surface of the closed end 210 can be smooth and without sharp or stepped transitions or variations in thickness, except for a protruding portion formed at the central longitudinal axis and that protrudes inward into the inner volume of the preform body (not shown in the embodiment of FIG. 2C). The protruding portion may be configured to mate with a stretch rod during stretching of the preform in a subsequent blow molding process to form a container, in order to maintain the stretch rod substantially centered at the central longitudinal axis.

In various embodiments, the preform body can include a transition portion 212 where the sidewall 220 and closed end 210 meet. In various embodiments the transition portion 212 is formed on an outer surface of the preform body where the sidewall 220 meets the closed end 210. The configuration and geometry of the transition portion 212 can assist with forming a relatively thin and movable base portion during blow molding. Further, a portion of the transition portion 212 can form or assist with forming a standing or support surface, such as a standing ring, for the blow molded container to support itself, for example on a flat surface. The support surface generally may be thicker than the movable base portion.

Thicknesses of various portions of the preform 200, and in particular respective thicknesses of the closed end 210, the transition portion 212, and the sidewall 220, can determine the final material distribution of the container, the material properties, and the container geometry. In various embodiments, the closed end 210 can have a portion that is thinner than any portion of the sidewall 220. Optionally, the closed end 210 can have a portion that is thinner than any other portion of the preform 210. In various embodiments, the portion of the closed end 210 that is thinner than any other portion of the preform 200 is the entire closed end. Optionally, the thickness of the closed end 210 may or may not vary, and the thinnest portion of the preform is the portion 214 at the central longitudinal axis of the preform. In various embodiments, the sidewall 220 can have a first thickness immediately adjacent the transition portion 212; the transition portion 212 can have a thickness less than the immediately adjacent sidewall portion, in some cases continuously decreasing toward the closed end 210; and the closed end 210 can have a thickness that decreases from the thickness of the transition portion 212 to a minimum thickness of the preform 200 at portion 214 located at the central longitudinal axis of the preform.

The preform 200 design (including thicknesses and geometry) can affect the final material distribution for the subsequent container, the material's subsequent properties, and the container geometry. For example, the preform 200 shown in FIGS. 2C and 2D—in conjunction with a blow molding cavity—has a geometry to form a base of a container with a bottom end portion that is thin enough to allow movement in the subsequent container due to internal pressure influence, but with sidewalls thicker than the bottom end portion such that deformation is confined to the movable bottom end portion, without deformation or significant deformation of the sidewalls of the container. For example, a minimum thickness of the second end 210 can be 50% or less than a maximum thickness of the sidewall 220. As but one specific example of thickness dimensions of compression molded preforms according to various embodiments of the disclosed subject matter, an end portion 210 of the preform 200 that forms a movable bottom end portion of the base can have a minimum thickness of 1.5 mm at portion 214, for example, and sidewalls 220 of the preform can have a maximum thickness of 3.5 mm, thereby providing a thin, flexible bottom end of the container with a relatively thick sidewall.

Figure 3A:
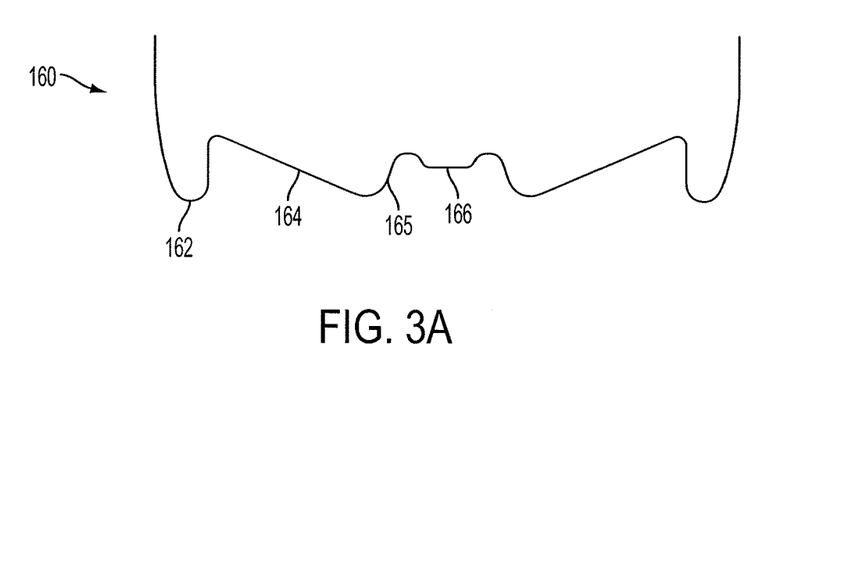
FIG. 3A is a cross section view of a base portion of a blow molded container formed from the preform of FIGS. 2A and 2B.

FIG. 3A is a cross section view of a base portion 160 of a blow molded container formed from the preform of FIGS. 2A and 2B.

As discussed above, for injection molded containers, crystallinity of a gate portion can cause the preform to resist or unsatisfactorily perform stretching or orientation during formation of the container. Such resistance or unsatisfactory performance by the gate portion during blow molding can cause a thin part surrounding the gate portion to tear or holes in the base to be formed. To prevent tearing or holes from forming, when the container formed from an injection molded preform is blow molded, a hold gate area or pedestal may be used to keeps the gate portion from stretching. Item 166 in FIG. 3A represents a position a pedestal may be positioned in order to prevent portions 164, 165 of the container from being torn or having holes formed therein during the blow molding process. Further, because of the geometry of the container at portion 165 and as well as the crystallized gate portion 166, the distribution of plastic material may be uneven and not all of the bottom end portion can be oriented. Thus, a portion or all of the bottom end may not be able to be made as thin as would be desired or of a uniform thinness. Further, not all of the bottom end portion may have the desired strength, as not all of the bottom end may have been sufficiently stretched and oriented.

Figure 3B:
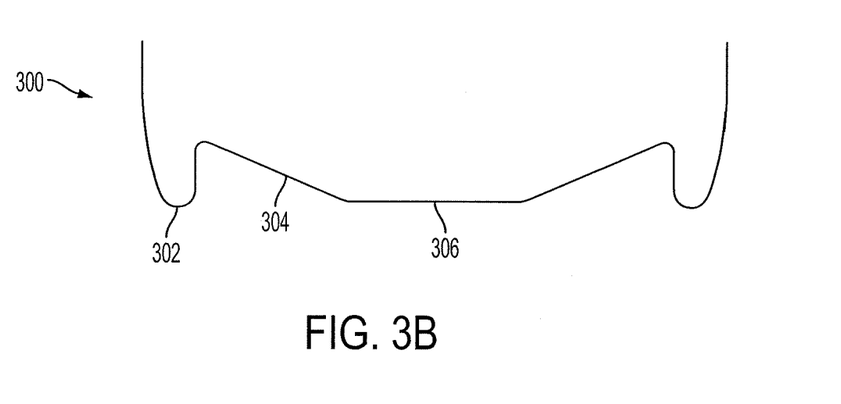
FIG. 3B is a cross section view of a base portion of a blow molded container formed from a preform, such as that shown in FIGS. 2C, 2D, and 4A, according to various embodiments of the disclosed subject matter.

FIG. 3B is a cross section view of a base portion 300 of a blow molded container formed from a preform, such as those shown in FIGS. 2C, 2D, and 4A, according to various embodiments of the disclosed subject matter. Base portion 300 includes a support structure 302, such as a standing ring (continuous or discontinuous), a first movable portion 304 of the bottom end, and a second movable portion 306 of the bottom end. In various embodiments, the transition portion of the preform is configured to form the support structure 302. Some or all of the movable portion may be formed at a downward angle with respect to an interior of the container. For example, FIG. 3B shows first movable portion 304 at a downward angle with respect to the interior of the container. Second movable portion 306 is shown formed at a horizontal position, though embodiments of the disclosed subject matter are not limited to the shown arrangement. The geometry shown in FIG. 3B is merely an example of a geometry of a base portion for a blow molded container with a movable bottom end portion and is in no way meant to be limiting.

The base portion can be configured to move in response to internal forces within the container. In particular, the movable bottom end portion can move upward and/or downward, depending upon the pressure or force experienced. In various embodiments, the movable portion's movement is contained such that it is at all times at or above a plane running through a bottom most portion of the support structure 302. In various embodiments, the movable base portion is caused to be pulled inward toward the interior of the container in response to a hot-filling and cooling operation. Alternatively, the movable base portion, for example, movable portion 306, is configured to be mechanically pushed in order to move the movable portion 306, and optionally movable portion 304, toward an interior of the container in order to compensate a vacuum force inside the container. In various embodiments the movable portion 304 and optionally movable portion 306 can be inverted by the internal vacuum pressure itself, by a mechanical apparatus, or by a combination thereof.

The movable bottom end portion may have a thickness that is either even in thickness or transitions gradually to a thinnest portion at the central longitudinal axis of the container. For example, portion 304 may be of a same thickness as portion 306, and their thicknesses may be uniform. Alternatively, portion 304 may have a thickness that decreases as it approaches portion 306. Portion 306 can have either a uniform thickness less than the thickness of portion 304, or it can have a thickness that decreases to a thinnest portion at the central longitudinal axis of the container. Thus, an entirety of the movable bottom end portion (i.e., portions 304 and 306) can be oriented as a result of the blow molding operation.

Figure 4B:
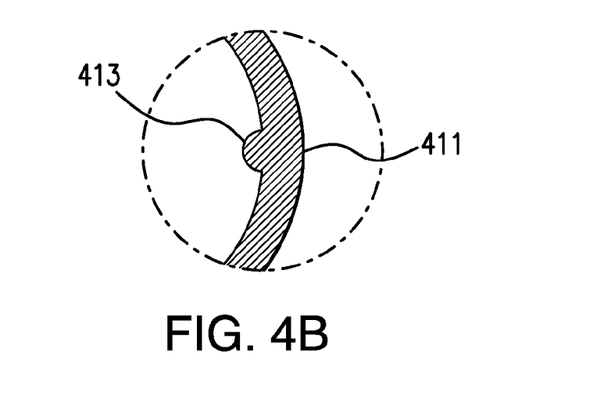
FIG. 4B is an expanded view of the circled area from FIG. 4A.

FIG. 4A is side, cross section view of a compression molded gateless preform 400 according to various embodiments of the disclosed subject matter. FIG. 4B is an expanded view of the circled area from FIG. 4A. The gateless compression molded preform 400 can be configured to form a blow molded container with a movable or invertible bottom end portion.

The preform 400 includes a body defining an inner volume and having an open end 430 which defines an opening into the inner volume, a closed end 410 opposite the open end in an axial, length-wise direction of the preform body, and a sidewall 420 that extends from the open end 430 to the closed end 410 along a central longitudinal axis of the preform body. In various embodiments, sidewall 420 can have a relatively thin portion 424 adjacent open end 430. Portion 424 may be thinned to form a shoulder portion of the container that leads to the neck and open end of the container.

In various embodiments, the open end 430 can have a cylindrical finish with external threads provided to mate with a closure, such as a cap or lid. In various embodiments, the cylindrical finish can have a ring-shaped flange portion provided, for example, to facilitate handling or further processing of the preform.

As mentioned above, the closed end 410 is gateless. Thus, an end portion 411 of the closed end 410 located at the central longitudinal axis is also gateless. Accordingly, an entirety of the closed end 410 is configured to be oriented during blow molding operation to form the blow molded container. Further, in various embodiments the closed end 410 is without a weld line, visible or otherwise. Closed end 410 can be rounded, for example, in the form of a hemisphere, a half globe, or a dome. Moreover, in various embodiments, an entire or substantially entire outer surface of the closed end can be smooth. The outside of the closed end of the preform can be smooth in order to facilitate removal of the preform 400 from the mold. Closed end 401 is configured to form a movable or invertible base portion of a subsequently formed container.

An inner surface of the closed end 410 also can be generally rounded, for example, in the form of a hemisphere, a half globe, or a dome. Optionally, the inner surface of the closed end 410 may generally conform to the shape of the outer surface of the closed end 410, varying slightly because of a change in thickness at the closed end 410 in various embodiments, for example. In various embodiments, the inner surface of the closed end 410 can be smooth and without any (i.e., one or more) stepped or sharp transitions or variations in thickness. Optionally, as shown in FIGS. 4A and 4B, an entirety of the inner surface of the closed end 410 can smooth and without sharp or stepped transitions or variations in thickness, except for a protruding portion 413 formed at the central longitudinal axis and that protrudes inward into the inner volume of the preform body. The protruding portion 413 may be configured to mate with a stretch rod during stretching of the preform during a subsequent blow molding process to form a container, in order to maintain a stretch rod substantially centered at the central longitudinal axis. Note, however, that protruding portion 413 is an optional feature preforms according to various embodiments of the disclosed subject matter. Therefore, the preform 400 shown in FIG. 4A may omit this feature, regardless of whether the preform is to be stretch blow molded or not.

In various embodiments, the preform body can include a transition portion 412 where the sidewall 420 and closed end 410 meet. In various embodiments the transition portion 412 is formed on an outer surface of the preform body where the sidewall 420 meets the closed end 410. In various embodiments, the configuration and geometry of the transition portion 412 can assist with creation of a thin base portion during blow molding. Further, a portion of the transition portion 412 can form or assist with forming a standing or support surface, such as a standing ring, for the blow molded container to support itself, for example on a flat surface.

In various embodiments the transition portion 412 can include a first portion and a second portion, the first portion being adjacent sidewall 420 and the second portion being adjacent closed end 410. In various embodiments the first portion may be viewed as a bump with respect to the second portion. First portion may be curved and have a radius of curvature R1. Likewise, the second portion may be curved and have a radius of curvature R2. In various embodiments the radii of curvature are different. Optionally, second radius of curvature R2 is greater than the first radius of curvature R1. Moreover, the orientations of the first and second radii of curvature are different, opposite, for example. In various embodiments, the direction of the radius of curvature (R1) for the first portion is generally inward and the direction of the radius of curvature (R2) for the second portion is generally outward.

Thicknesses of various portions of the preform 400, and in particular respective thicknesses of the closed end 410, the transition portion 412, and the sidewall 420, can determine the final material distribution of the container, the material properties, and the container geometry. In various embodiments, the closed end can have a portion that is thinner than any portion of the sidewall 420. Optionally, the closed end 410 can have a portion that is thinner than any other portion of the preform 410. In the case of the preform 400 shown explicitly in FIG. 4A, the minimum thickness of the closed end 410 is not at the central longitudinal axis. Rather, it is a portion adjacent the portion associated with protrusion 413.

Figure 5:
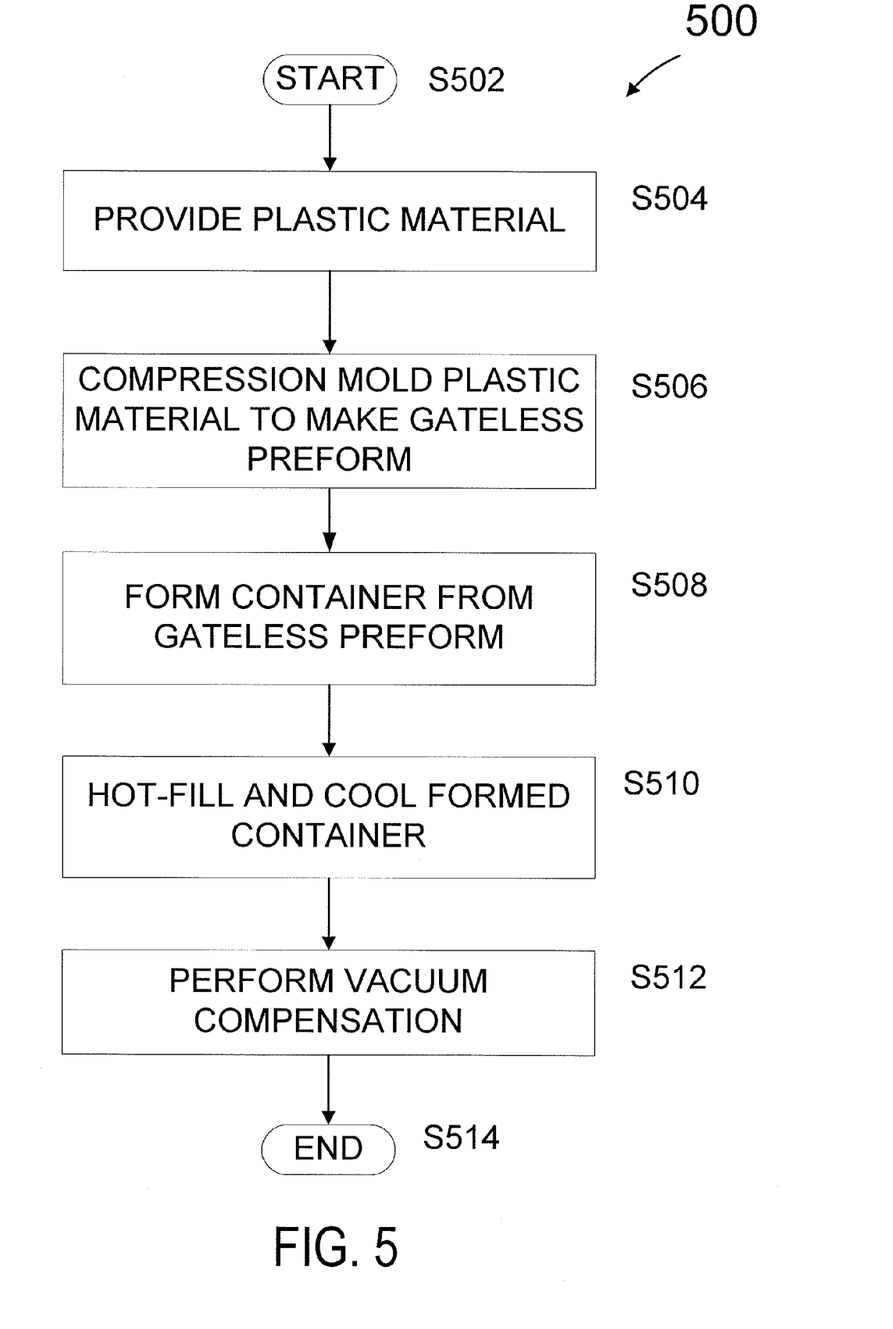
FIG. 5 is a flow chart of a method according to various embodiments of the disclosed subject matter.

FIG. 5 is a flow chart of a method 500 according to various embodiments of the disclosed subject matter.

Method 500 can begin at S502 and proceed to S504, whereby an amount of plastic material can be provided for compression molding a preform according to various embodiments of the disclosed subject matter. The plastic material can be provided by any suitable system or apparatus, in any suitable form, such as described above. For example, the plastic may be provided in the form of a plastic rod of material cut off from an extruder. In various embodiments the amount of plastic material may be a predetermined amount.

Method 500 can proceed to S506. At S506 the amount of plastic material can be compression molded in a mold to form and make a plastic preform according to various embodiments of the disclosed subject matter as described herein. In various embodiments, method 500 can end upon creation of the preform. FIG. 5, however, shows the method 500 proceeding from S506 to S508.

At S508, the preform may be used to form or make a container. The container can be made using any suitable technique, such as blow molding, injection blow molding, or stretch blow molding. In various embodiments, the formed container can have a sidewall formed based on the configuration of the sidewall of the preform, a support structure (e.g., a standing ring or surface) for supporting the container in an upright position on a flat surface that is formed based on the configuration of said transition portion, and a movable base portion that is formed based on the configuration of the closed end and/or transition portion of the preform. More specifically, in various embodiments, the formed container can have a bottom end portion that is thin enough to be movable, for example invertible, to compensate for internal pressures within the filled container. Further, the center of the movable base portion at the central longitudinal axis can be oriented as a result of the blow molding operation. In various embodiments, the entire movable base portion can be oriented as a result of the blow molding operation. Note that the method 500 can begin at S508 and end with S508. Thus, the specific method of blow molding a preform according to various embodiments of the disclosed subject matter can constitute a method separate and distinct from forming the preform.

After S508, the method can proceed to S510. At S510, the container can be subjected to hot-filling and cooling operations. Generally speaking, hot-fill and cooling operations can include hot-filling the container with a consumable product, for example, a fluid, such as a liquid (e.g., water, soda, tea, applesauce, etc.), sealing the container with a top, lid, or cap, for example, and subjecting the filled and sealed container to a cooling operation, such as a refrigerator, a water stream, or simply allowing it to cool to ambient temperature of a room.

Upon hot-filling the container and/or upon sealing of the hot-filled container, internal forces may be present within the container (e.g., force due to weight of the product, elevated temperatures, etc.). Such pressures can be compensated for by a flexible or movable portion at a bottom end of the container base. The movable portion can have a geometry based on the shape and configuration of the preform and can move in response to an internal force or forces caused by hot-filling of a product into the container. For example, the movable portion may move downward to a desired amount or may move downward no more than a desired amount. Such movement can be based on the hot-filled product, the geometry of the movable portion, and/or the temperature of the hot-filled product.

Upon cooling of the hot-filled container, a vacuum may be induced in the sealed container. Thus, after S510, the method can proceed to S512. At S512, compensation for the internal vacuum formed in the container can be performed.

In various embodiments the vacuum is compensated for, for example, by reducing it, eliminating it, or creating an overpressure in the container. The vacuum can be compensated for by any suitable means. For example, in various embodiments of the disclosed subject matter, the container base (i.e., the bottom end of the container) can have a flexible or movable portion. Optionally, the flexible or movable portion can be the same as the portion of the container that can move in response to filling and capping a hot-filled container. Alternatively, this flexible or movable portion may be different from the portion of the container that can move in response to filling and capping a hot-filled container, or it can have overlapping features. Optionally, the container can have one or more supplemental vacuum panels located on the sidewall of the container, for example, to provide supplemental compensation of the internal vacuum. Each supplemental vacuum panel can reduce a first portion of the vacuum, and the movable end portion of the container can remove a second portion of the vacuum. In various embodiments, the supplemental vacuum panel or panels can prevent other portions of the container from deforming until the movable portion moves or is caused to move to reduce the vacuum pressure. Alternatively, no supplemental or additional vacuum panels may be provided on the sidewall or otherwise, and the movable bottom portion is the sole means by which to reduce, eliminate, or create an overpressure in the container.

In various embodiments, the movable portion can be pulled inward by the force of the vacuum itself. Optionally or alternatively, the movable portion may be moved by a mechanical apparatus, such as a push rod. In various embodiments the movable portion may be inverted, either by the force of the internal vacuum or by a mechanical apparatus. In various embodiments the movable bottom end portion is caused to move such that no other portion of the container is caused to move by the induced vacuum. For example, based on the specific configuration and/or respective thicknesses of the movable bottom end portion and the sidewalls of the container, when a vacuum is induced in the container only the movable bottom end portion moves or is caused to move to compensate for the vacuum, and the sidewalls of the container remain substantially unmoved or without deformation.

In FIG. 5, method 500 is shown ending after S512 at S514. It is apparent that further processing of the container may occur, such as transporting the container on a flat surface while supported by its standing ring or surface, performing post-fill inspections, labeling, etc.

While the disclosed subject matter has been described in conjunction with a number of embodiments, it is evident that many alternatives, modifications and variations would be or are apparent to those of ordinary skill in the applicable arts. Accordingly, Applicants intend to embrace all such alternatives, modifications, equivalents, and variations that are within the spirit and scope of the disclosed subject matter described herein.

What is claimed is:

1. A compression molded plastic preform for forming a blow molded plastic container having an invertible base portion, the preform having a hollow body defining an inner volume, the preform body comprising:
    a first, open end defining an opening into the inner volume, the first end having threads;
    a second, closed end opposite the first end in a length-wise direction of the preform body; and
    an intermediate portion between the first end and the second end, the intermediate portion having a sidewall extending in the length-wise direction of the preform body along a central longitudinal axis of the preform body and a transition portion adjacent the second closed end, the intermediate portion tapering from a relatively thin portion adjacent the first open end to a relatively thick portion and tapering from the relatively thick portion through the transition portion to the second closed end, the transition portion including an outer surface with a first curved portion having a convex cross-section in side view and a second curved portion having a concave cross-section in side view,
    wherein the second end of the preform body is gateless and without a weld line,
    wherein the second end is hemispherical, an entirety of an outer surface of the second hemispherical end being smooth, and an inner surface of the second hemispherical end at least at a portion of the second end not at the central longitudinal axis being smooth and without any sharp transitions, and
    wherein the second end has a portion that is thinner than any other portion of the preform.

2. The preform of claim 1, wherein the second end has a protruding portion that is formed at the central longitudinal axis and that protrudes inward into the inner volume of the preform body, the protruding portion being adapted to mate with a stretch rod for stretching the preform during the blow molding process in order to maintain the stretch rod substantially centered at the central longitudinal axis.

3. The preform of claim 1, wherein the entirety of the second end is configured to be oriented during a blow molding operation to form the blow molded container.

4. The preform of claim 1, wherein the portion of the second end that is thinner than any other portion of the preform is the entire second end.

5. The preform of claim 1, wherein the second end has a portion at the central longitudinal axis that is the thinnest portion thereof.

6. The preform of claim 1, wherein the transition portion is adapted to form a thin base portion of a resultant container formed by blow molding the preform, the thin base portion being thinner than a sidewall of the resultant container.

7. The preform of claim 1,
    wherein the transition portion is configured to form a standing surface for the blow molded container, and the second end is configured to form the invertible base portion,
    wherein the base portion is invertible in response to internal pressures experienced by the container upon hot-filling and cooling.

8. The preform of claim 1,
    wherein the transition portion is configured to form a standing surface for the blow molded container, and the second end is configured to form the invertible base portion, and
    wherein the base portion is adapted to be mechanically inverted by a mechanical apparatus external to the blow molded container to reduce an internal vacuum created by hot-filling the blow molded container with a product, capping the hot-filled container, and cooling hot-filled and capped container.

9. The preform of claim 1, wherein the second end is configured to form the invertible base portion, the base portion being adapted to pull inward under vacuum pressure during hot-fill and cooling operations.

10. The preform of claim 1, a minimum thickness of the second end is 50% or less than a maximum thickness of the sidewall.

11. The preform of claim 1, wherein the transition portion provides a transition from the sidewall to the second end and the first curved portion is adjacent to the sidewall and the second curved portion is adjacent to the second end.

12. The preform of claim 11, wherein the convex cross-section of the first curved portion is defined by a radius projecting toward the longitudinal axis, and the concave cross-section of the second curved portion is defined b a radius projecting outward from the longitudinal axis.

* * * * *

UNITED STATES PATENT AND TRADEMARK OFFICE
CERTIFICATE OF CORRECTION

PATENT NO. : 8,962,114 B2
APPLICATION NO. : 12/916528
DATED : February 24, 2015
INVENTOR(S) : Thomas E. Nahill and Ralph Armstrong Page 1 of 1

It is certified that error appears in the above-identified patent and that said Letters Patent is hereby corrected as shown below:

IN THE CLAIMS:

At column 14, line 59:

"cross-section of the second curved portion is defined b a" should read

- cross-section of the second curved portion is defined by a -

Signed and Sealed this
Seventh Day of July, 2015

Michelle K. Lee
*Director of the United States Patent and Trademark Office*